United States Patent [19]

Lempa, Jr.

[11] 4,175,721
[45] Nov. 27, 1979

[54] TRIM TAB CONTROL MECHANISM

[76] Inventor: Bernard J. Lempa, Jr., 8422 Carvel St., Houston, Tex. 77036

[21] Appl. No.: 811,907

[22] Filed: Jun. 30, 1977

[51] Int. Cl.² .................. B64C 13/04; B64C 13/30
[52] U.S. Cl. ..................... 244/83 F; 74/424.8 R; 244/83 K
[58] Field of Search ............ 244/83 F, 83 K, 83 J, 244/83 R, 83 G, 75 R, 82; 74/502, 503, 424.8 R, 89.15 R, 553, 10 R, 10.85; 116/115, 124 A, 124 C

[56] References Cited

U.S. PATENT DOCUMENTS

| 997,648 | 7/1911 | Cavanagh et al. | 116/124 A |
| 2,206,475 | 7/1940 | Bowers | 244/83 R |
| 2,349,332 | 5/1944 | Angell | 74/424.8 R |
| 2,666,334 | 1/1954 | Nalle | 74/424.8 R |
| 2,940,697 | 6/1960 | Lawrence | 244/83 G |
| 3,038,352 | 6/1962 | Murphy | 74/424.8 R X |

FOREIGN PATENT DOCUMENTS

| 675207 | 2/1930 | France | 244/83 K |
| 437237 | 10/1935 | United Kingdom | 116/124 A |
| 687682 | 2/1953 | United Kingdom | 244/82 |

Primary Examiner—Barry L. Kelmachter
Attorney, Agent, or Firm—Bill B. Berryhill

[57] ABSTRACT

Apparatus for controlling the movement and positioning of an aircraft trim tab comprising: an elongated stabilizer member mounted in the cockpit of the aircraft for reciprocal forward and aft movement and having a threaded portion thereon; a cable member connecting the stabilizer member to the trim tab for movement and positioning thereof in response to reciprocal movement of the stabilizer member; and a control member threadedly engaging the threaded portion of the stabilizer member and manually engageable and rotatable from inside the cockpit for translating rotation of the control member to reciprocal movement of the stabilizer member.

9 Claims, 5 Drawing Figures

TRIM TAB CONTROL MECHANISM

BACKGROUND OF THE INVENTION

Most conventional aircraft are equipped with an elevator. The elevator is a movable auxiliary airfoil attached to the tailplane (usually the horizontal stabilizer) of an aircraft, which when moved changes the distribution of lift along the cross-section of the tailplane. The stability of an aircraft is significantly determined by the displacement of the center of pressure of the resultant aerodynamic lift force. When the elevator is moved up or down, the resultant lift force produces an up or down motion in the aircraft.

As weight in the aircraft is shifted or varied, such as gas being burned, or cargo or passenger load changes, unusually heavy control stick pressures will be required to keep the aircraft in the proper horizontal attitude. To alleviate these control stick pressures and thusly pilot fatigue, an adjustable trim tab is installed on the trailing edge of the elevator and sometimes on the rudder and ailerons.

The trim tab control mechanism, located in the cockpit, allows the pilot to finely adjust the trim tab position.

OBJECTS OF THE INVENTION

It is the primary object of the present invention to provide a mechanism which will produce an up or down motion in a trim tab.

It is another object of the present invention to provide a mechanism which will allow fine adjustment of the position of a trim tab.

It is another object of the present invention to provide a mechanism which will reduce control stick pressure by the adjustment of a trim tab.

It is another object of the present invention to provide a mechanism which will reduce pilot fatigue caused by heavy control stich pressure by adjusting a trim tab.

It is another object of the present invention to provide a mechanism which will, by adjusting a trim tab, compensate for variations in the weight (center of gravity) distribution of an aircraft.

It is another object of the present invention to provide a mechanism for controlling the trim tab position which may be located within the cockpit of an aircraft and be easily accessible to the pilot and provide him with an indication of the position of the trim tab.

It is a further object of the present invention to provide a mechanism for controlling the position of a trim tab which functions simply and is inexpensive to manufacture.

DETAILED DESCRIPTION OF THE INVENTION

Figure 1:
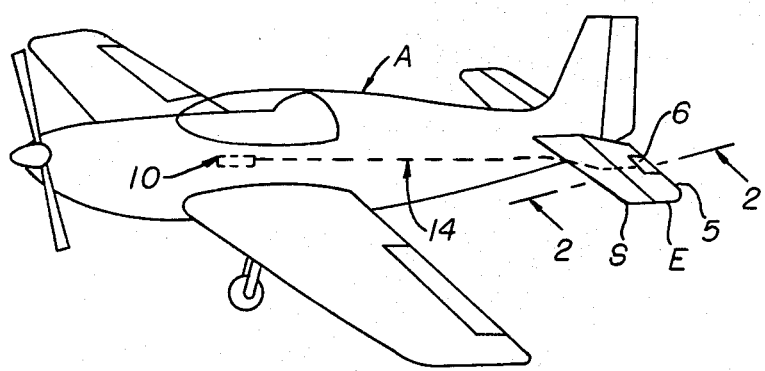
FIG. 1 is a perspective view of a typical aircraft illustrating the relative placement of the present invention.

With reference to FIG. 1, the trim tab control mechanism is located within the cockpit of aircraft A. It is connected by means of a conventional control cable and housing 14 to a trim tab 6, which is located on the trailing edge 5 of the elevator portion E of a horizontal stabilizer S of a typical aircraft tailplane.

Figure 2:
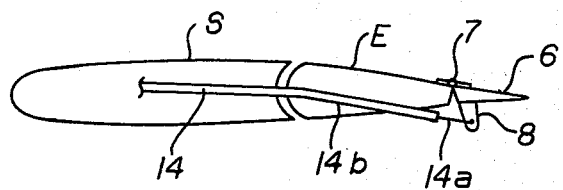
FIG. 2 is a schematic cross section of the tailplane of the aircraft taken along lines 2—2 of FIG. 1, illustrating the placement of the trim tab device.

As best shown in FIG. 2, the trim tab 6 is a small airfoil shaped device which is attached to the elevator E by conventional means such as an aircraft type hinge 7. Located on the bottom side of the trim tab 6 is a bellcrank lever 8. The cable 14a is attached to the lever 8 by conventional cable attachment means. The cable housing 14b is secured to the stabilizer S which remains stationary. As the cable 14a is moved in and out of the housing 14b, it causes the trim tab 6 to rotate about the axis of the hinge 7.

Figure 3:
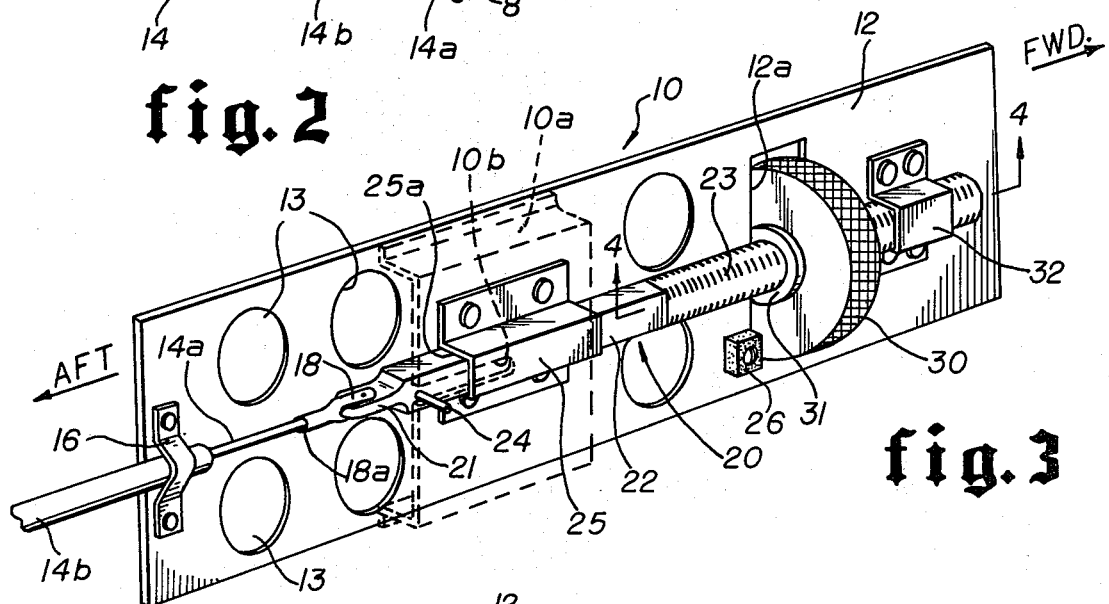
FIG. 3 is a perscective view of the present invention.

FIG. 3 shows the trim tab control mechanism 10 in detail. The trim tab mechanism 10 is comprised of a mounting plate 12 which may have holes 13 therein, to make it lighweight. On the aft end the control cable housing 14b is secured by means of a clamp 16. The clamp is secured to the mounting plate 12 by conventional means such as riveting or bolting. Protruding out of the cable housing 14b is a section of cable 14a of sufficient length to allow adequate in and out movement for proper operation of the mechanism. A fork 18 is attached to the end of the cable by means such as a female solder joint 18a. The fork 18 is pinned to a keystock stabilizer 20. The keystock stabilizer 20 is a length of metal having a substantially square cross section. Its length is divided into several shapes as follows; at one end is a flat tongue 21, machined to facilitate insertion into and pinning of the fork 18, a length of square cross section 22, near the tongue 21 of sufficient length to allow adequate forward and aftward motion for proper operation of the mechanism, and a threaded square section 23. Located near the tongue 21 on the square cross section 22 and protruding outwardly therefrom is a position indicator 24. The position indicator 24 is a rod shaped member which protrudes through a slot 10b in the mechanism cover box 10a. A portion of the cover box 10a is indicated by dotted lines. It is not shown in its entirety so that the functioning parts of the mechanism may be shown more clearly, but it should be understood that it covers the entire mechanism leaving only the position indicator 24 and control knob 30 exposed.

Approximately midway on the square length 22, between the position indicator 24 and the beginning of the threaded section 23 of the keystock stabilizer 20, is located a guide bracket 25. The guide bracket 25 is secured to the mounting plate 12 by conventional means such as riveting or bolting. The internal cavity 25a of the guide bracket 25 substantially conforms to the square cross section 22 but allows sufficient clearance so that the keystock stabilizer 20 may easily move forward and aft.

Located on the threaded section 23 of keystock stabilizer 20 is a control knob 30. The control knob is screwed onto the threaded section by means of internal threads 30a. On each side of the control knob are thrust washers 31. The thrust washers 31 are of sufficient diameter to allow them to extend through an opening 12a in mounting plate 12, and their outside surfaces to contact each side of the opening 12a. Secured to the base plate 12 by a conventional screw is a friction block 26, a material such as felt or rubber, which rubs against the side of the control knob 30. The friction block 26 will prevent any vibration induced rotation of knob 30.

Near the end of the keystock stabilizer 20 opposite the tongue 21 is a centralizer bracket 32 attached to the mounting plate 12 by conventional means. The threaded section 23 of keystock stabilizer 20 extends beyond the centralizer bracket 32 for a distance sufficient to allow the end of the threaded section 23 to be contained within the centralizing bracket when the keystock stabilizer 20 is at its fully extended position.

Figures 4, 5:
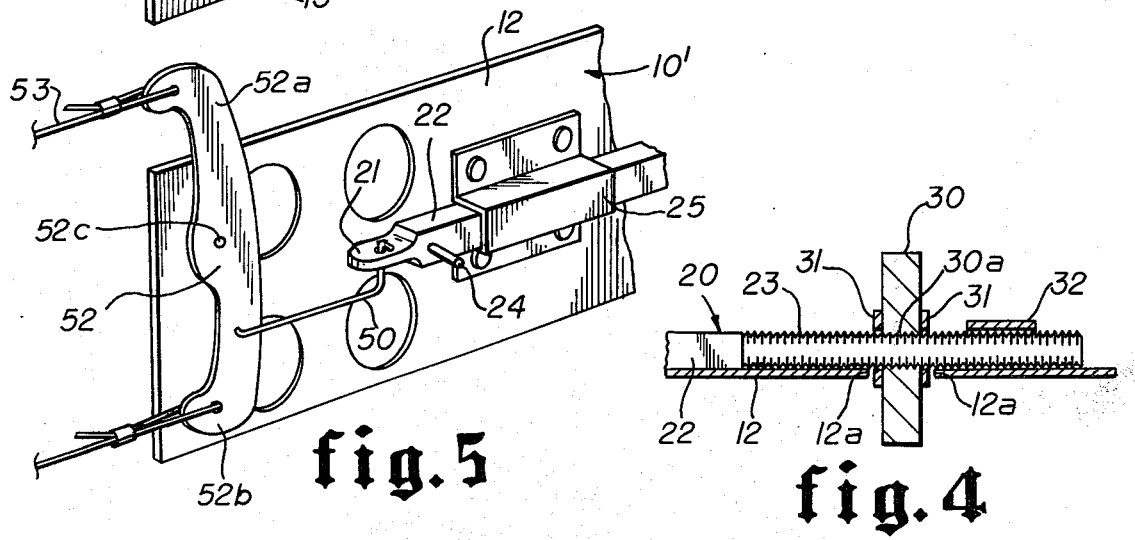
FIG. 4 is a cross section of a portion of the present invention taken along lines 4—4 of FIG. 3.
FIG. 5 is a perspective view of a portion of a modified form of the present invention.

Referring now the FIGS. 3 and 4, an explanation of the operation of the trim tab control mechanism follows. When it becomes necessary to adjust the trim tab 6, the pilot rotates the control knob 30 clockwise or counterclockwise. The rotation of the control knob 30 will force one of the thrust washers 31 to contact the opening 12a in the mounting plate 12, thus the control knob 30 cannot travel along the threaded section 23. Continued rotation of control knob 30 will cause the threaded section 23 to move in or out of the control knob 30 by means of the internal threads 30a. This in or out motion causes the rectangular cross section 22 to move in or out of the guide bracket 25. The guide bracket 25 prevents rotation of keystock stabilizer 20. Since the cable 14a is attached to the tongue 21 of the keystock stabilizer 20, the in or out motion of the keystock stabilizer 20 causes the cable 14a to slide in or out of its housing 14b. The cable housing 14b is stationary with the aircraft and therefore the in or out motion is transferred to the bell-crank lever 8, causing the trim tab to rotate about the axis of the hinge. Forces created by different trim tab positions are transferred to the elevator. Forces created by different elevator positions cause a more nose up or nose down attitude in the airplane.

The position indicator 24 keeps the pilot visually aware of the trim tab position.

FIG. 5 shows a modified version 10' of the trim tab control mechanism. In this modification, the tongue 21 is connected by means of a push-pull rod 50 to a bell-crank lever 52. The bell-crank lever 52 consists of two arms 52a and 52b with a common fulcrum 52c at the center thereof. A conventional two cable control system 53 may be attached to the arms 52a and 52b of the bell-crank lever 52. The push-pull rod 50, being attached below the fulcrum 52c, causes the arms 52a and 52b to pivot around the fulcrum 52c when the push-pull rod 50 is moved in or out. Movement of the arms 52a and 52b is transmitted by the control cables through an array of pulleys to a conventional bellcrank attached to the trim tab 6. (A conventional bell-crank has a configuration consisting of a bellcrank 8, FIG. 2, placed on top and bottom of trim tab 6.)

The invention claimed is:

1. Apparatus for controlling the movement and position of the trim tab of an aircraft having a cockpit therein comprising:
    elongated stabilizer means mounted in said cockpit of said aircraft for reciprocal forward and aft movement and having a threaded portion and a portion of substantially square cross-section thereon, said square portion being mounted in a bracket having a substantially square opening so as to permit said forward and aft movement of said stabilizer means but preventing rotation thereof;
    cable means connecting said stabilizer means to said trim tab for said movement and positioning thereof in response to said reciprocal movement of said stabilizer means; and
    a control member threadedly engaging said threaded portion of said stabilizer means and manually engageable and rotatable from inside said cockpit for translating rotation of said control member to said reciprocal movement of said stabilizer means.

2. Apparatus as set forth in claim 1 in which said control member is confined on each side thereof by thrust means, permitting said rotation of said control member but preventing forward and aft movement thereof.

3. Apparatus as set forth in claim 1 in which said stabilizer means is provided with an indicator member projecting outwardly therefrom, but movable therewith upon said fore and aft movement of said stabilizer means to indicate the position of said trim tab.

4. Apparatus as set forth in claim 2 including a rotation retarding member frictionally engaging said control member to prevent accidental rotation thereof.

5. Apparatus as set forth in claim 1 in which said stabilizer means is mounted in a second bracket on the opposite side of said control member from said first mentioned bracket.

6. Apparatus for controlling the movement and position of the trim tab of an aircraft having a cockpit therein comprising:
    a mounting plate located in said cockpit of said aircraft;
    an elongated stablizer member mounted on said mounting plate for reciprocal forward and aft movement and having a threaded portion thereon;
    first and second bracket members attached to said mounting plate and by which said stabilizer member is mounted on said mounting plate for said reciprocal movement thereof;
    a cable member connecting one end of said stabilizer member to said aircraft trim tab for said movement and positioning thereof in response to said reciprocal movement of said stabilizer member; and
    a control nut member threadedly engaging said threaded portion of said stabilizer member between said first and second bracket members, said nut member being manually engageable and rotatable from inside said cockpit for translating rotation of said nut member to said reciprocal movement of said stabilizer member.

7. Apparatus as set forth in claim 6 in which a portion of said stabilizer member which slides within said first bracket member is substantially square in cross section, said first bracket member having a substantially square opening so that said stabilizer member and said first bracket member cooperate to allow said reciprocal movement of said stabilizer member but prevent rotation thereof.

8. Apparatus as set forth in claim 7 including an indicator member projecting outwardly from said stabilizer member and movable therewith to indicate the position of said trim tab.

9. Apparatus as set forth in claim 6 including a rotation retarding member affixed to said mounting plate and frictionally engaging said nut member to prevent accidental rotation thereof.

* * * * *